(12) United States Patent
Yoshikawa et al.

(10) Patent No.: US 11,312,651 B2
(45) Date of Patent: Apr. 26, 2022

(54) OPTICAL FIBER DRAWING METHOD AND DRAWING APPARATUS

(71) Applicant: SUMITOMO ELECTRIC INDUSTRIES, LTD., Osaka (JP)

(72) Inventors: Satoshi Yoshikawa, Yokohama (JP); Iwao Okazaki, Yokohama (JP); Takashi Yamazaki, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 377 days.

(21) Appl. No.: 16/330,886

(22) PCT Filed: Sep. 4, 2017

(86) PCT No.: PCT/JP2017/031834
§ 371 (c)(1),
(2) Date: Mar. 6, 2019

(87) PCT Pub. No.: WO2018/047778
PCT Pub. Date: Mar. 15, 2018

(65) Prior Publication Data
US 2019/0210910 A1    Jul. 11, 2019

(30) Foreign Application Priority Data

Sep. 7, 2016 (JP) .............................. JP2016-174401

(51) Int. Cl.
*C03B 37/027* (2006.01)
*C03B 37/029* (2006.01)
*G02B 6/02* (2006.01)

(52) U.S. Cl.
CPC ...... *C03B 37/02736* (2013.01); *C03B 37/029* (2013.01); *G02B 6/02* (2013.01); *C03B 2205/80* (2013.01)

(58) Field of Classification Search
None
See application file for complete search history.

(56) References Cited

U.S. PATENT DOCUMENTS

| 8,322,165 B2 | 12/2012 | Otosaka et al. |
| 2011/0265522 A1 | 11/2011 | Okada |
| 2016/0002090 A1 * | 1/2016 | Okazaki ............... C03B 37/029 65/435 |

FOREIGN PATENT DOCUMENTS

| CN | 103304135 A | * | 9/2013 | ........... C03B 37/029 |
| CN | 203683379 U | * | 7/2014 | |

(Continued)

*Primary Examiner* — Lisa L Herring
(74) *Attorney, Agent, or Firm* — Faegre Drinker Biddle & Reath LLP

(57) ABSTRACT

An optical fiber drawing method where a glass base material passes through an opening provided in a drawing furnace from the material side and drawing is performed by suspending and descending the material into the drawing furnace while being sealed by a sealing mechanism provided in the vicinity of the opening, in which a first portion of the sealing mechanism seals a gap between an outer peripheral surface of the material and an inner surface of the opening when drawing starts and a tapered portion of the material starts passing through the first portion, and a second portion is disposed above the first portion before sealing by the first portion becomes ineffective, and then conduction between inside and outside of the drawing furnace is carried out to prevent fluctuation of pressure inside the furnace immediately after disposing the second portion and the conduction is interrupted when the material further descends.

2 Claims, 3 Drawing Sheets

(56) References Cited

FOREIGN PATENT DOCUMENTS

| JP | A-2011-230978 | 11/2011 |
| JP | 2014-162671 A | 9/2014 |
| JP | 2016-28989 A | 3/2016 |
| JP | B2-5923997 | 5/2016 |
| WO | WO-2015/050103 A1 | 4/2015 |

* cited by examiner

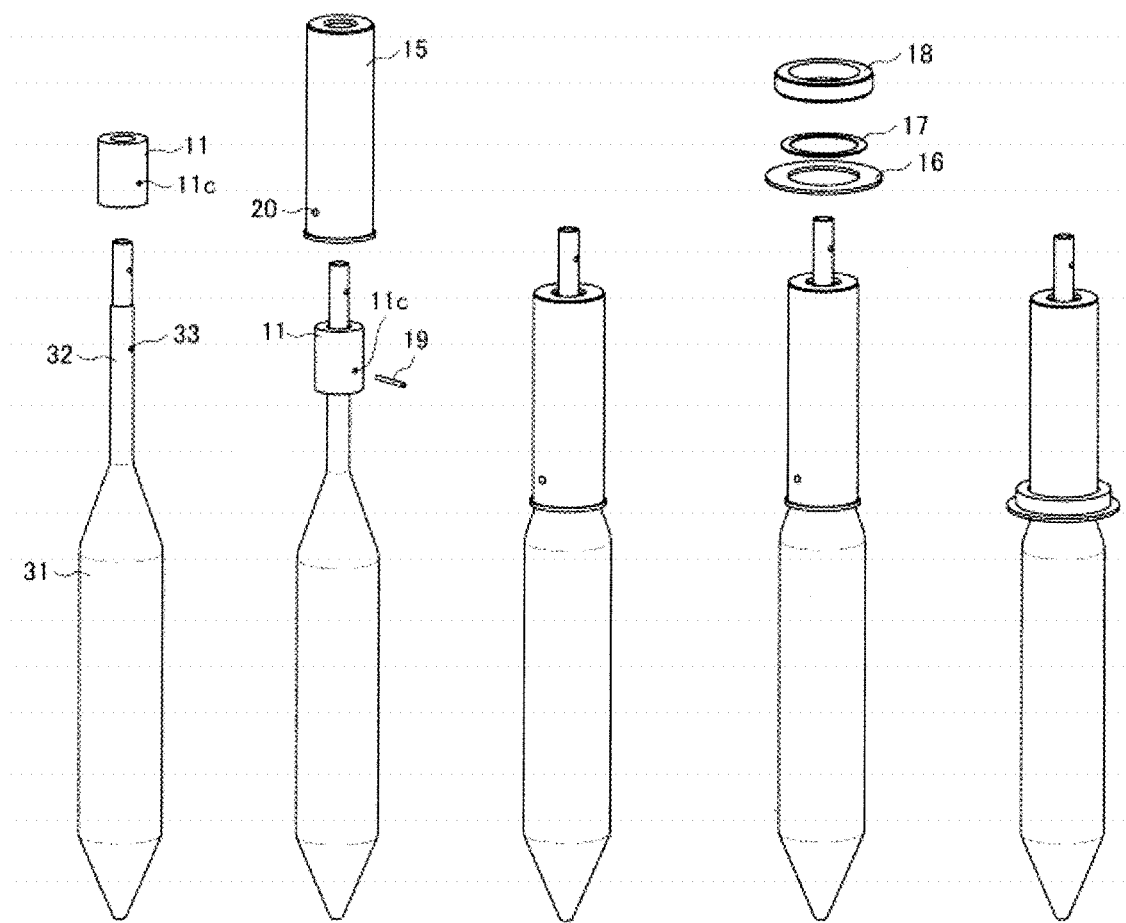

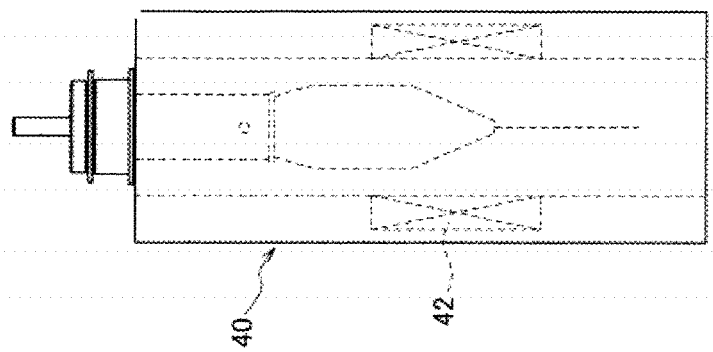
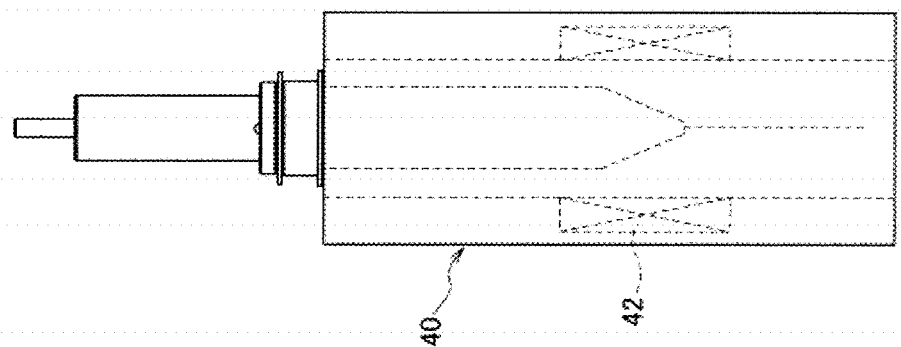
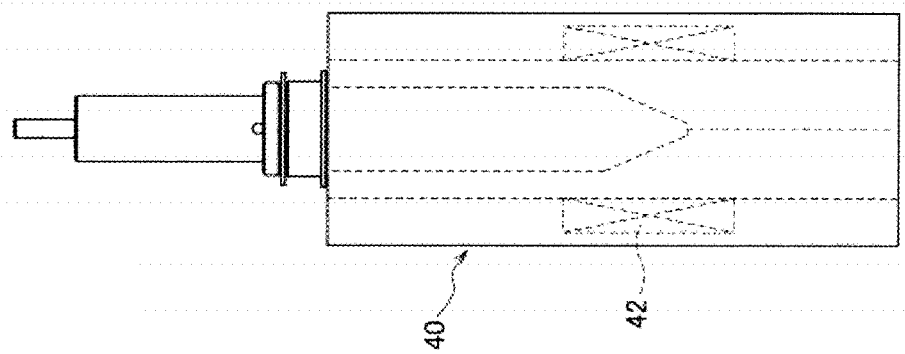
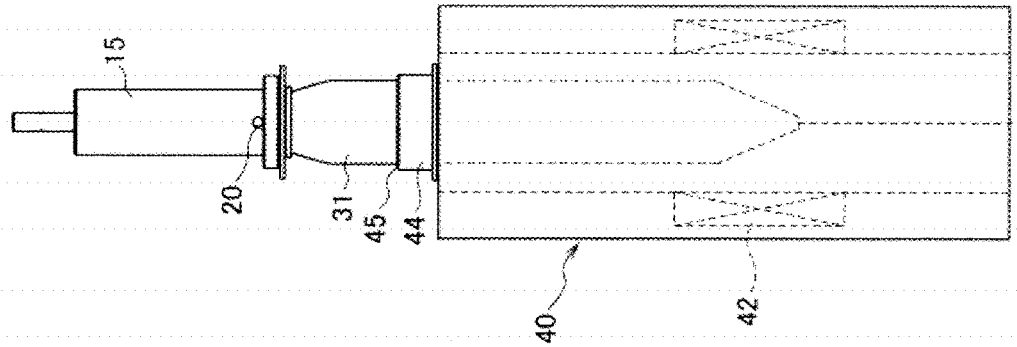

OPTICAL FIBER DRAWING METHOD AND DRAWING APPARATUS

TECHNICAL FIELD

The present invention relates to an optical fiber drawing method and a drawing apparatus for heating and fusing a glass base material for an optical fiber and drawing an optical fiber.

BACKGROUND ART

Drawing of an optical fiber by a drawing furnace is performed by heating and fusing a glass base material for an optical fiber (hereinafter referred to as a glass base material) with a heater or the like. Temperature inside the drawing furnace is extremely high as 2000° C. or more, so carbon is generally used for a furnace core tube or the like surrounding the glass base material. The carbon is oxidized and consumed in a high-temperature oxygen-containing atmosphere. In order to prevent this problem, a noble gas such as argon gas and helium gas or nitrogen gas (hereinafter referred to as inert gas or the like) is fed into the drawing furnace.

In the glass base material, an upper end is usually reduced in diameter to a tapered shape and connected to a dummy rod (also referred to as a supporting rod) having a small diameter, and the glass base material is suspended and supported in the furnace core tube of the drawing furnace. However, it is difficult to seal the tapered portion where the diameter greatly changes and the connecting portion with the dummy rod, and thus it is difficult to keep airtight when the portions are included in the drawing furnace. Therefore, there is a method where an upper chamber is disposed above the drawing furnace in a form of extending the furnace core tube upward and the glass base material including the tapered portion and the connecting portion with the dummy rod is accommodated in the upper chamber, and further an outer peripheral surface of the dummy rod is sealed at an upper end of the upper chamber.

As disclosed in Patent Literature 1, there is an optical fiber drawing method where an optical fiber is drawn while being sealed by a sealing mechanism at an upper portion of a drawing furnace. A first sealing portion of the sealing mechanism seals at an outer peripheral surface of a glass base material for an optical fiber when drawing starts and a seal is switched to a second sealing portion disposed above the first sealing portion after a vicinity of a tapered portion of the glass base material for an optical fiber starts passing through the first sealing portion, and the second sealing portion seals at an outer peripheral surface of a sleeve member fixed by surrounding an outer periphery of a dummy rod.

CITATION LIST

Patent Literature

[Patent Literature 1]: Japanese Patent Application Publication No. 2014-162671

SUMMARY OF THE INVENTION

Technical Problem

The technique proposed in Patent Literature 1 has a sufficient sealing function and is a preferable technical form. However, as gas in a drawing furnace cannot escape when a seal is switched from a first sealing portion to a second sealing portion, in some cases, pressure in the drawing furnace changes. The change in pressure causes a change in the air flow in the drawing furnace, so there is a possibility that a wire diameter of an optical fiber being drawn may vary.

The present invention is made in view of those circumstances and an object thereof is to provide an optical fiber drawing method and a drawing apparatus which prevents pressure fluctuation in a drawing furnace by operating a gas release hole while switching a seal.

According to an aspect of the present invention, there is provided an optical fiber drawing method where a glass base material for an optical fiber of which one end is connected to a dummy rod passes through an opening provided in a drawing furnace from the glass base material side and drawing is performed by suspending and descending the glass base material into the drawing furnace while being sealed by a sealing mechanism provided in the vicinity of the opening, in which a first sealing portion of the sealing mechanism seals a gap between an outer peripheral surface of the glass base material for an optical fiber and an inner surface of the opening when drawing starts and a tapered portion of the glass base material starts passing through the first sealing portion, and a second sealing portion is disposed above the first sealing portion before sealing by the first sealing portion becomes ineffective, and then conduction between inside and outside of the drawing furnace is carried out to prevent fluctuation of pressure inside the furnace immediately after disposing the second sealing portion and the conduction is interrupted when the glass base material further descends.

According to another aspect of the present invention, there is provided an optical fiber drawing apparatus for drawing a glass base material for an optical fiber of which one side is connected to a dummy rod, the apparatus including a sleeve member covering a part of the dummy rod and an outer periphery of the glass base material and in which the sleeve member is provided with a ventilation hole for conducting inside and outside of the drawing furnace.

According to the present invention, by providing an optical fiber drawing method and a drawing apparatus for preventing pressure fluctuation in a drawing furnace by operating a gas release hole while switching of a seal, it is possible to prevent fluctuation in a wire diameter of an optical fiber being drawn.

BRIEF DESCRIPTION OF THE DRAWINGS

FIGS. 2A to 2E are views illustrating an outline of assembly of a second sealing member according to an embodiment of the present invention.

FIGS. 3A to 3D are views illustrating an example according to an embodiment of the present invention.

Figure 1:
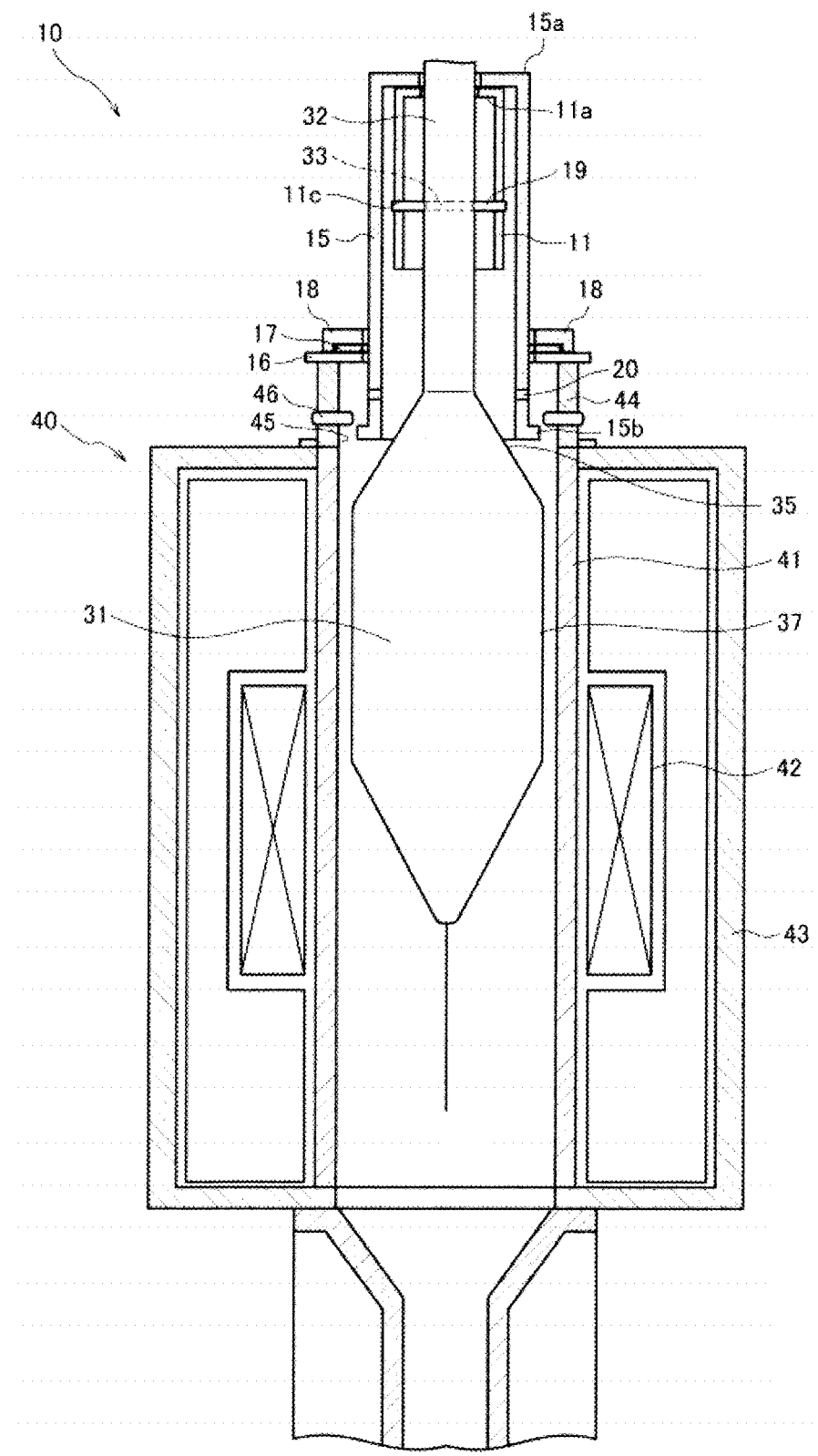
FIG. 1 is a diagram illustrating an outline of an optical fiber drawing apparatus according to an embodiment of the present invention.

DESCRIPTION OF EMBODIMENTS (Description of Embodiment of Invention)

First, embodiments of the present invention will be listed and described.

(1) According to an aspect of the present invention, there is provided an optical fiber drawing method where a glass base material for an optical fiber of which one end is connected to a dummy rod passes through an opening provided in a drawing furnace from the glass base material side and drawing is performed by suspending and descending the glass base material into the drawing furnace while being sealed by a sealing mechanism provided in the vicinity of the opening, in which a first sealing portion of the sealing mechanism seals a gap between an outer peripheral surface of the glass base material for an optical fiber and an inner surface of the opening when drawing starts, a second sealing portion is disposed above the first sealing portion before a tapered portion of the glass base material starts passing through the first sealing portion so that sealing by the first sealing portion becomes ineffective, conduction between inside and outside of the drawing furnace is carried out to prevent fluctuation of pressure inside the furnace immediately after disposing the second sealing portion, and the conduction is interrupted when the glass base material further descends.

According to the embodiment, at the moment when the second sealing mechanism joins the opening of the drawing furnace, in other words, at the moment when the drawing furnace is blocked from the external environment, a ventilation passage conducting inside and outside of the drawing furnace is used to discharge the gas in the drawing furnace to prevent the pressure fluctuation in the drawing furnace. By preventing the pressure fluctuation, change in airflow in the drawing furnace is prevented and variation in wire diameter of the optical fiber being drawn is prevented.

(2) In the optical fiber drawing method according to (1), a sleeve member covering a part of the dummy rod and an outer periphery of the glass base material is provided and inside and outside of the drawing furnace are conducted by a ventilation hole provided in the sleeve member, and the conduction is interrupted by blocking the ventilation hole. According to the embodiment, by properly selecting a size of the ventilation hole, it is possible to adjust a flow rate of gas flowing out from the drawing furnace through a ventilation path to the outside. That is, it is also possible to appropriately design a size, shape, position, and the like of the ventilation hole so as to prevent the fluctuation in the furnace pressure while preventing the outside air from flowing into the drawing furnace.

(3) In the optical fiber drawing method according to (2), the sleeve member is fixed to the dummy rod and a gap between the second sealing portion and the sleeve member is sealed by a ring-shaped member provided in the sleeve member, and the ring-shaped member slides on an outer peripheral surface of the sleeve member to seal the opening after a seal is switched to the second sealing portion. According to the embodiment, even after the fusing and drawing of the glass base material progresses, the glass base material descends, and the seal is switched to the second sealing portion, inside of the drawing furnace including the glass base material can be blocked from outside.

(4) According to one aspect of the present invention, there is provided an optical fiber drawing apparatus for drawing a glass base material for an optical fiber of which one side is connected to a dummy rod, the apparatus including a sleeve member covering a part of the dummy rod and an outer periphery of the glass base material and in which the sleeve member is provided with a ventilation hole for conducting inside and outside of the drawing furnace.

According to the embodiment, at the moment when the second sealing mechanism joins the opening of the drawing furnace, the ventilation passage conducting inside and outside of the drawing furnace is used to discharge the gas in the drawing furnace to prevent the pressure fluctuation in the drawing furnace. By preventing the pressure fluctuation, change in airflow in the drawing furnace is prevented and variation in wire diameter of the optical fiber being drawn is prevented.

(Detailed Description of Embodiment of Invention)

Next, a preferred embodiment of the optical fiber drawing apparatus of the present invention will be described with reference to the drawings. In the following description, in some cases, the same reference numerals and letters are assigned to the same components in different drawings and the description thereof will be omitted.

FIG. 1 is a view illustrating an outline of an optical fiber drawing apparatus according to an embodiment of the present invention and shows a configuration of the entirety of an apparatus in a process of inserting a glass base material into a drawing furnace. FIGS. 2A to 2E are views illustrating an outline of assembly of a second sealing member in the embodiment of the present invention and show an example of an assembling procedure for assembling a member to be the second sealing member on the glass base material. In FIGS. 2A to 2E, in order to avoid complication, only the reference numerals and letters necessary for explanation are described, and FIG. 1 will be referred to for details.

As illustrated in FIG. 1, the drawing furnace of the optical fiber has a structure in which a lower portion of a glass base material 31 for an optical fiber which is suspended and supported is heated, and then it is fused and suspended downward from a fused lower end portion so that the glass fiber has a predetermined outer diameter.

An optical fiber drawing apparatus 10 according to the embodiment includes configurations roughly grouped into three, that are the glass base material 31 which is the raw material of the optical fiber, a drawing furnace 40, and a sealing mechanism for sealing between the glass base material 31 and the drawing furnace 40.

Description of Glass Base Material and Sealing Parts

First, the glass base material 31, the portions to be joined to the glass base material 31, and the sealing mechanism will be explained. In the following description, an example where glass base material 31 is obtained by depositing and heating glass at a lower end of a dummy rod 32 and drawing is performed by grasping the dummy rod 32 will be described. However, the present invention is not limited to the present example. For example, the glass base material 31 and the dummy rod 32 may be connected to each other and drawing may be performed by grasping the dummy rod 32 with a supporting rod or the like.

As illustrated in FIG. 1, for example, the glass base material 31 includes a straight body portion 37 (main body portion) of which an upper end portion is reduced in diameter via a tapered portion 35 and the dummy rod 32 is connected thereto. An upper end portion of the dummy rod 32 is suspended and supported so as to be movable in a vertical direction by being grasped by a suspension supporting device (not illustrated) and the dummy rod 32 is inserted and accommodated in the drawing furnace. Hereinafter, an example of a procedure of assembling a sealing mechanism (especially, a second sealing portion) provided in the glass base material 31 will be described.

First, as illustrated in FIGS. 2A and 2B, a first cap 11 having a tubular shape is disposed in a direction from an upper end side of the dummy rod 32 to the glass base material 31 such that the dummy rod 32 becomes an axis. The first cap 11 is made of heat resistant quartz glass, metal, carbon, SiC-coated carbon, or the like. The first cap 11 includes a lid portion 11a on an upper end side provided with an opening through which the dummy rod 32 can be inserted, and a hole portion 11c on a side surface serving as a pin hole.

The first cap 11 descends until the hole portion 11c reaches a predetermined position where the hole portion 11c substantially coincides with a pin hole 33 formed in the dummy rod 32 and is disposed so as to cover the dummy rod 32. Then, a pin 19 is inserted from the hole portion 11c to the pin hole 33 and the first cap 11 is fixed to the dummy rod 32.

Next, as illustrated in FIGS. 2B and 2C, a sleeve member 15 is disposed so as to cover an outer periphery of the first cap 11 from an upper end side of the dummy rod 32. An upper end of the sleeve member 15 is a lid portion 15a provided with an opening slightly larger than the outer diameter of the dummy rod and a lower surface of the lid portion 15a is placed on the lid portion 11a provided in the upper end portion of the first cap 11.

The sleeve member 15 covers a part of the tapered portion 35 of the glass base material 31 and the dummy rod 32 and is a cylindrical member made of heat resistant quartz glass, metal, carbon, SiC-coated carbon, or the like. As described above, the sleeve member 15 can be fixed to a dummy rod by a convex portion or the like provided on the dummy rod, rather than fixing by the first cap 11.

A flange portion 15b for placing a sealing mechanism is provided at the lower end of the sleeve member 15 and a ventilation hole 20 passing through an outer wall of the cylinder is formed at a predetermined position on the outer peripheral surface on a lower side of the sleeve member 15. The predetermined position and the like of the ventilation hole 20 depends on the mutual relationship with the sealing mechanism when the glass base material 31 descends, so details thereof will be described below.

Next, as illustrated in FIGS. 2D and 2E, a first ring 16, a carbon ring 17, and a second ring 18 are fitted to the flange portion 15b along an outer edge of the sleeve member 15. The carbon ring 17 is a ring-shaped member and an inner periphery of the carbon ring 17 has an inner diameter slightly larger than the outer diameter of the sleeve member 15 to minimize a gap with an outer periphery of the sleeve member 15, therefore sealing inside and outside of the drawing furnace 40. The carbon ring 17 is made of, for example, carbon, SiC-coated carbon, or the like to obtain such a highly accurate member.

The first ring 16 and the second ring 18 are disposed so as to pinch the carbon ring 17 in order to ensure the sealing function of the carbon ring 17. In the embodiment, the first ring 16 and the second ring 18 are ring-shaped members made of heat resistant quartz glass, metal, carbon, SiC-coated carbon, or the like. The first ring 16 functions as a pedestal of the carbon ring 17 and the second ring 18 functions as a weight of the carbon ring 17 to prevent misalignment. The carbon ring 17 corresponds to a ring-shaped member of the present invention, and the sleeve member 15 and the carbon ring 17 form a second sealing member (sealing is performed between the sleeve member 15 and the carbon ring 17).

The second sealing member is not limited to the embodiment described above. As the second sealing member, for example, the carbon ring 17 may be omitted and the first ring 16 and the second ring 18 may be integrated, and sealing may be performed by a pressure loss between the sleeve member 15 and the integrated ring-shaped member, thereby forming a second sealing member.

Description of Drawing Furnace and Optical Fiber Drawing Process

Next, referring to FIG. 1 and FIGS. 3A to 3D illustrating an example of the optical fiber drawing process, the overall configuration including the drawing furnace, the sealing function in the optical fiber drawing process, and the operation and function of the ventilation hole 20 or the like will be described. In FIGS. 3A to 3D, in order to avoid complication, only the reference numerals and letters necessary for explanation are described, a part of the configuration is omitted, and FIG. 1 will be referred to for details. In FIGS. 3A to 3D, the size of the ventilation hole 20 is illustrated in an enlarged manner compared to FIG. 1 in order to make it easy to see the process of blocking conduction through the ventilation hole 20.

As referring to FIG. 1 and FIGS. 2A to 2E, the optical fiber drawing apparatus 10 is assembled as described above and the sleeve member 15, the first ring 16, the carbon ring 17, and the second ring 18 are disposed on the glass base material 31 to constitute a second sealing portion.

As illustrated in FIG. 1, the heating furnace which is the main body of the drawing furnace 40 is configured such that a heater 42 for heating is arranged so as to surround a furnace core tube 41 into which the glass base material 31 is supplied in an insertion manner and the heater 42 is surrounded by a heat insulating material such as carbon so as to prevent the heat of the heater 42 from being dissipated to outside, and the entire outside portion thereof is surrounded by a furnace housing 43. On an upper side of the furnace housing 43, there is disposed a furnace core tube extension member 44 of a cylindrical shape for adjusting a seal starting position or the like, depending on the length of the inserted glass base material 31 or the like. An opening 45 for inserting the glass base material 31 into a furnace core tube 41 is formed in the furnace housing 43 and the furnace core tube extension member 44 extends the opening 45 upward. The furnace core tube extension member 44 is a tubular member made of heat resistant quartz glass, metal, carbon, SiC-coated carbon, or the like.

Referring to FIG. 3A, the glass base material 31 including the second sealing portion is suspended just above the opening 45 and descending is started, and the lower side of the glass base material 31 is already inserted into the drawing furnace 40 through the opening 45. Noble gas such as argon gas and helium gas or nitrogen gas (hereinafter referred to as inert gas or the like) is fed into the drawing furnace 40 and the pressure of the gas is higher than that of the outside. In a state of the FIG. 3A, there is a gap between the opening 45 or the furnace core tube extension member 44 and the straight body portion 37 of the glass base material 31 for lowering the glass base material 31. However, a first sealing portion provided in the furnace core tube extension member 44 or the like prevents the outside air from flowing into the drawing furnace 40.

Referring to FIG. 1, a first sealing member 46 is installed under the furnace core tube extension member 44. The first sealing member 46 is a member constituted of, for example, a plurality of blade members in contact with the outer periphery of the straight body portion 37 of the glass base material 31, and by applying force from the outside, an opening portion of the drawing furnace 40 is sealed. Regardless of the method of sealing, the first seal portion may be, for example, a member performing sealing by supplying inert gas or the like or a member which is configured to seal a sealing member such as a carbon sheet or a carbon felt arranged so as to annularly surround the outer peripheral surface of the glass base material by urging the sealing member with the pressure of a sealing gas or the like against the outer periphery of the glass base material. It is also possible to use a member including an annular sealing body or the like in a seal gas supply spacer.

Next, referring to FIGS. 1 and 3B, the glass base material 31 including the second sealing portion descends lower than the position in FIG. 3A and the first ring 16 comes into contact with an upper end of the furnace core tube extension member 44. At this point, the first sealing member 46 is in contact with the outer periphery of the straight body portion 37 of the glass base material 31 and the inside of the drawing furnace 40 is sealed by the first sealing member 46. As illustrated in FIG. 1, the sleeve member 15 is in contact with the outer periphery of the dummy rod 32 and performs sealing at the upper portion of the sleeve member 15 and the first ring 16 is placed on the furnace core tube extension member 44 at the lower portion of the sleeve member 15, therefore a gap between the furnace core tube extension member 44 and the first ring 16 is sealed. By performing sealing by contacting the carbon ring 17 with the outer periphery of the sleeve member 15, the drawing furnace 40 is also sealed from the outside by the second sealing portion.

However, when the state transits from FIG. 3A to FIG. 3B, the outflow of the gas in the drawing furnace 40 which was flowing out to the outside from a gap between the glass base material 3 and the first sealing portion is eliminated, therefore the pressure may rise in the drawing furnace 40. As a result, the ventilation hole 20 is formed at a position where the ventilation hole 20 conducts the drawing furnace 40 and the outside when the state transits to FIG. 3B. That is, at the moment when the first ring 16 comes into contact with the upper end of the furnace core tube extension member 44, the ventilation hole 20 is located above the second carbon ring and the inside of the furnace and the outside are conducted.

In such a configuration, even when the drawing furnace 40 is sealed by the second sealing portion, the gas in the drawing furnace 40 flows out through the ventilation hole 20 to the outside, in such a manner that it is possible to prevent a sudden change in pressure in the drawing furnace 40.

That is, according to the embodiment, especially at the moment when the sealing mechanism (second sealing portion) joins the opening 45 of the drawing furnace 40, in other words, at the moment when the drawing furnace 40 is completely blocked from the external environment, the ventilation hole 20 (ventilation passage) is used to discharge the gas in the drawing furnace 40 to prevent the pressure fluctuation in the drawing furnace 40. By preventing the pressure fluctuation, a change in airflow in the drawing furnace 40 is prevented and variation in wire diameter of the optical fiber being drawn is prevented.

For example, the hole diameter or the like of the ventilation hole 20 can be appropriately designed and selected so that the flow rate of the gas flowing out from the drawing furnace 40 through the ventilation hole 20 to the outside is adjusted. That is, it is also possible to design size, shape, position, or the like of the ventilation hole 20 so as to prevent the fluctuation in the furnace pressure caused by inserting the glass base material 31 into the drawing furnace 40 while preventing the outside air from flowing into the drawing furnace 40.

Next, referring to FIG. 3C, the glass base material 31 covered by the sleeve member 15 gradually descends into the drawing furnace 40 while the first ring 16, the carbon ring 17, and the second ring 18 are placed on the upper end portion of the furnace core tube extension member 44. Simultaneously, the inner edge of the carbon ring 17 slides on the outer periphery of the sleeve member 15, so that the sealing function can be maintained continuously. The ventilation hole 20 is gradually blocked, and therefore when the pressure fluctuation in the drawing furnace 40 is alleviated, the ventilation hole 20 is accommodated in the drawing furnace 40 after finishing the action of the gas outflow. That is, at this point, conduction between the inside of the furnace and the outside is blocked.

Since the first sealing member 46 changes state from being in contact with the outer periphery of the straight body portion 37 of the glass base material 31 to facing the tapered portion 35, the sealing function of the first sealing portion is lost and the inside of the drawing furnace 40 is sealed by the second sealing portion.

Referring to FIG. 3D, the glass base material 31 further descends as drawing of the optical fiber progresses and drawing is finished. It is possible to arbitrarily set a position of fusing of the glass base material 31 to end the drawing. Depending on material of the sleeve member 15 and the like, when it comes close to or inserted into the furnace core tube 41, there is a possibility that those members will be fused and damaged, and thus it may be difficult to reuse. However, when the sleeve member 15 and the like are made of heat resistant material such as carbon, fusing damage can be prevented.

Although the description of the embodiment is completed with the above description, the aspects of the present invention are not limited to the embodiment described above and modifications are possible without departing from the spirit of the present invention.

The invention claimed is:

1. An optical fiber drawing method where a glass base material for an optical fiber of which one end is connected to a dummy rod passes through an opening provided in a drawing furnace for the glass base material to be drawn and drawing is performed by suspending and descending the glass base material into the drawing furnace while being sealed by a sealing mechanism provided in the vicinity of the opening, the method comprising:
   installing a first seal on an opening provided in a drawing furnace for a glass base material to be drawn;
   covering with a sleeve member i) a part of a dummy rod and ii) an outer periphery of the glass base material, the glass base material having one end that is connected to the dummy rod;
   fixing the sleeve member to the dummy rod;
   fitting a second seal on an outer edge of the sleeve member;
   sealing with the first seal of a sealing mechanism a gap between an outer peripheral surface of the glass base material for an optical fiber and an inner surface of the opening when drawing starts;
   sealing with the second seal that is disposed above the first seal before a tapered portion of the glass base material starts passing through the first seal so that sealing by the first seal becomes ineffective;
   sealing a gap between the second seal and the sleeve member by a ring-shaped member provided on the sleeve member, wherein the ring-shaped member slides on an outer peripheral surface of the sleeve member to seal the opening after sealing is switched from the first seal to the second seal;
   ventilating between inside and outside of the drawing furnace to discharge gas in the drawing furnace to prevent fluctuation of pressure inside the drawing furnace immediately after switching from the first seal to the second seal, wherein ventilating between the inside and the outside of the drawing furnace includes ventilating between the inside and the outside of the drawing furnace via a ventilation hole provided in the sleeve member; and interrupting ventilating between the inside and the outside of the drawing furnace when the glass base material further descends, wherein interrupting ventilating between the inside and the outside of the drawing furnace includes blocking the ventilation hole.

2. An optical fiber drawing apparatus that draws a glass base material for an optical fiber of which one side is connected to a dummy rod, the apparatus comprising:

a first seal installed on an opening provided in a drawing furnace for a glass base material to be drawn;

a sleeve member fixed to a dummy rod and covering a part of the dummy rod and an outer periphery of the glass base material, the glass base material having one end that is connected to the dummy rod;

a second seal fit on an outer edge of the sleeve member; and a ring-shaped member provided on the sleeve member, the ring-shaped member configured to seal a gap between the second seal and the sleeve member, and the ring-shaped member slides on an outer peripheral surface of the sleeve member to seal the opening after sealing is switched from the first seal to the second seal, wherein the sleeve member is provided with a ventilation hole that ventilates inside and outside of the drawing furnace and that discharges gas in the drawing furnace.

* * * * *